US012712782B2

(12) United States Patent
Li

(10) Patent No.: US 12,712,782 B2
(45) Date of Patent: Aug. 18, 2026

(54) CONFIGURATION OF NODE PORT FOR MAINTENANCE WITHOUT LOAD BALANCER COORDINATION

(71) Applicant: Visa International Service Association, San Francisco, CA (US)

(72) Inventor: Weigang Li, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 19/121,940

(22) PCT Filed: Nov. 10, 2022

(86) PCT No.: PCT/US2022/079621

§ 371 (c)(1),
(2) Date: Apr. 17, 2025

(87) PCT Pub. No.: WO2024/102160

PCT Pub. Date: May 16, 2024

(65) Prior Publication Data

US 2026/0113241 A1 Apr. 23, 2026

(51) Int. Cl.
*H04L 41/0894* (2022.01)
*H04L 41/0668* (2022.01)
(Continued)

(52) U.S. Cl.
CPC ...... *H04L 41/0894* (2022.05); *H04L 41/0668* (2013.01); *H04L 41/145* (2013.01); *H04L 43/10* (2013.01)

(58) Field of Classification Search
CPC . H04L 41/06; H04L 41/0654; H04L 41/0663; H04L 41/0668; H04L 41/0866;
(Continued)

(56) References Cited

U.S. PATENT DOCUMENTS 7,321,926 B1 1/2008 Zhang et al.
8,929,856 B1 1/2015 Kamboth et al.
(Continued)

FOREIGN PATENT DOCUMENTS

CN 101345663 A 1/2009
CN 110768853 A 2/2020
(Continued)

OTHER PUBLICATIONS

Cox et al., "Security policy transition framework for Software Defined networks", May 26, 2017, IEEE, 2016 IEEE Conference on Network Function Virtualization and Software Defined Networks (NFV-SDN) (2016, pp. 56-61) (Year: 2017).*
(Continued)

*Primary Examiner* — Davoud A Zand
(74) *Attorney, Agent, or Firm* — K&L Gates LLP

(57) ABSTRACT

A computer implemented method providing a network policy configured to prevent transaction data processing from being interrupted during maintenance performed on nodes in a cluster network. The network policy reduces maintenance period times and the amount of personnel needed to perform node maintenance by simulating node failure. The simulated node failure prevents new transaction data from being sent the node that is undergoing maintenance.

20 Claims, 7 Drawing Sheets

(51) Int. Cl.
*H04L 41/14* (2022.01)
*H04L 43/10* (2022.01)

(58) Field of Classification Search
CPC ............. H04L 41/0873; H04L 41/0894; H04L 41/145; H04L 43/10
See application file for complete search history.

(56) References Cited

U.S. PATENT DOCUMENTS

| | | | | |
|---|---|---|---|---|
| 8,939,056 | B1 * | 1/2015 | Neal, III | F42B 15/22 89/1.51 |
| 9,130,954 | B2 | 9/2015 | Joshi et al. | |
| 11,146,490 | B2 | 10/2021 | Agrawal | |
| 2010/0121932 | A1 | 5/2010 | Joshi et al. | |
| 2013/0007505 | A1 | 1/2013 | Spear | |
| 2014/0067983 | A1 | 3/2014 | Gabriel et al. | |
| 2014/0082142 | A1 * | 3/2014 | Geffin | H04L 41/32 709/217 |
| 2017/0011606 | A1 * | 1/2017 | Ceccon | G07G 1/0054 |
| 2018/0167307 | A1 * | 6/2018 | Barry | H04L 45/02 |
| 2022/0006755 | A1 | 1/2022 | Busick et al. | |

FOREIGN PATENT DOCUMENTS

| | | | |
|---|---|---|---|
| CN | 112737945 | A | 4/2021 |
| CN | 113796048 | A | 12/2021 |
| WO | 2024102160 | A1 | 5/2024 |

OTHER PUBLICATIONS

Supplementary European Search Report for corresponding European Application No. 22965365.4, mailed on Sep. 17, 2025.

International Search Report and Written Opinion for corresponding International Application No. PCT/US2022/079621 mailed Jul. 26, 2023.

* cited by examiner 100
114a
114b
114c
114n
112
110
106
108
102a
102b
102c
102n
104

CONFIGURATION OF NODE PORT FOR MAINTENANCE WITHOUT LOAD BALANCER COORDINATION

CROSS-REFERENCE TO RELATED APPLICATION

This application is a U.S. National Stage Entry under 35 U.S.C. § 371 of International Patent Application No. PCT/US2022/079621, entitled CONFIGURATION OF NODE PORT FOR MAINTENANCE WITHOUT LOAD BALANCER COORDINATION, filed Nov. 10, 2022, the entire disclosure of which is hereby incorporated by reference herein.

TECHNICAL FIELD

The present disclosure is directed to the configuration of nodes in a cluster network based on network policies. In particular, the technologies herein disclose network policies that simulate node failure that prevents new transaction data from being sent a node that is undergoing maintenance.

SUMMARY

In one aspect, the present disclosure provides a method comprising: receiving, by a network management server, a network policy corresponding to a node in a cluster pool comprising a plurality of nodes, wherein the node comprises a first port configured to receive transaction data and a second port configured to receive periodic health check messages from a load balancer; implementing, by the network management server, the network policy to configure a port restriction of the second port of the node, wherein the port restriction causes the load balancer to stop transmitting the transaction data to the first port; determining, by the network management server, that the transaction data received at the first port is processed by the node after implementing the network policy in preparing the node for maintenance; and revoking, by the network management server, the network policy to remove the port restriction at the second port after completion of the maintenance at the node based on a network policy status indicator.

In another aspect, the present disclosure provides a system comprising: a plurality of nodes; a cluster pool comprising the plurality of nodes; a load balancer server; a network management server communicably coupled to the plurality of nodes, wherein the network management server is configured to: receive a network policy corresponding to a node in a cluster pool, wherein the cluster pool comprises a plurality of nodes, and wherein the node in the cluster pool comprises a first port configured to receive transaction data and a second port configured to receive periodic health check messages from a load balancer; implement the network policy to configure a port restriction of the second port of the node, wherein the port restriction causes the load balancer to stop transmitting the transaction data to the first port; determine that transaction data received at the first port is processed by the node after implementing the network policy to prepare the node for maintenance; and revoke the network policy to remove the port restriction at the second port after completion of the maintenance at the node based on a network policy status indicator.

In yet another aspect, the present disclosure provides a non-transitory computer readable medium, with instructions stored thereon, when executed by one or more processors, cause the one or more processors to perform operations comprising: receiving a network policy corresponding to a node in a cluster pool comprising a plurality of nodes, wherein the node comprises a first port configured to receive transaction data and a second port configured to receive periodic health check messages from a load balancer; provisioning a back-up node to the cluster pool; initializing the back-up node to receive the transaction data; implementing the network policy to configure a port restriction of the second port of the node, wherein the port restriction causes the load balancer to stop transmitting the transaction data to the first port; determining that transaction data received at the first port is processed by the node after implementing the network policy in preparing the node for maintenance; and revoking the network policy to remove the port restriction at the second port after completion of the maintenance at the node based on a network policy status indicator.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
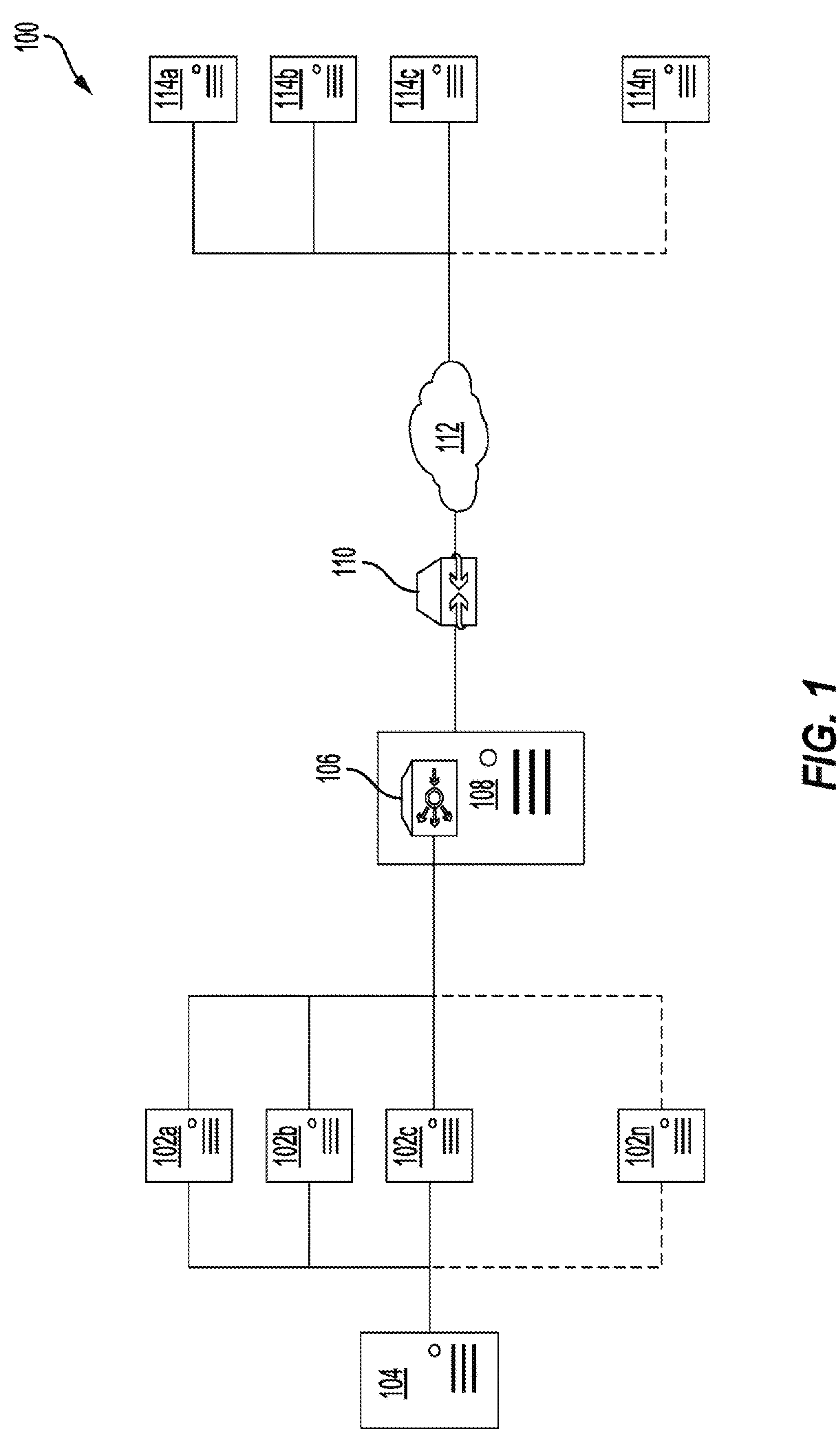

The [apparatuses, systems, and methods] disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a network architecture of a cluster network comprising a plurality of worker nodes, according to at least one aspect of the present disclosure.

Figure 2:
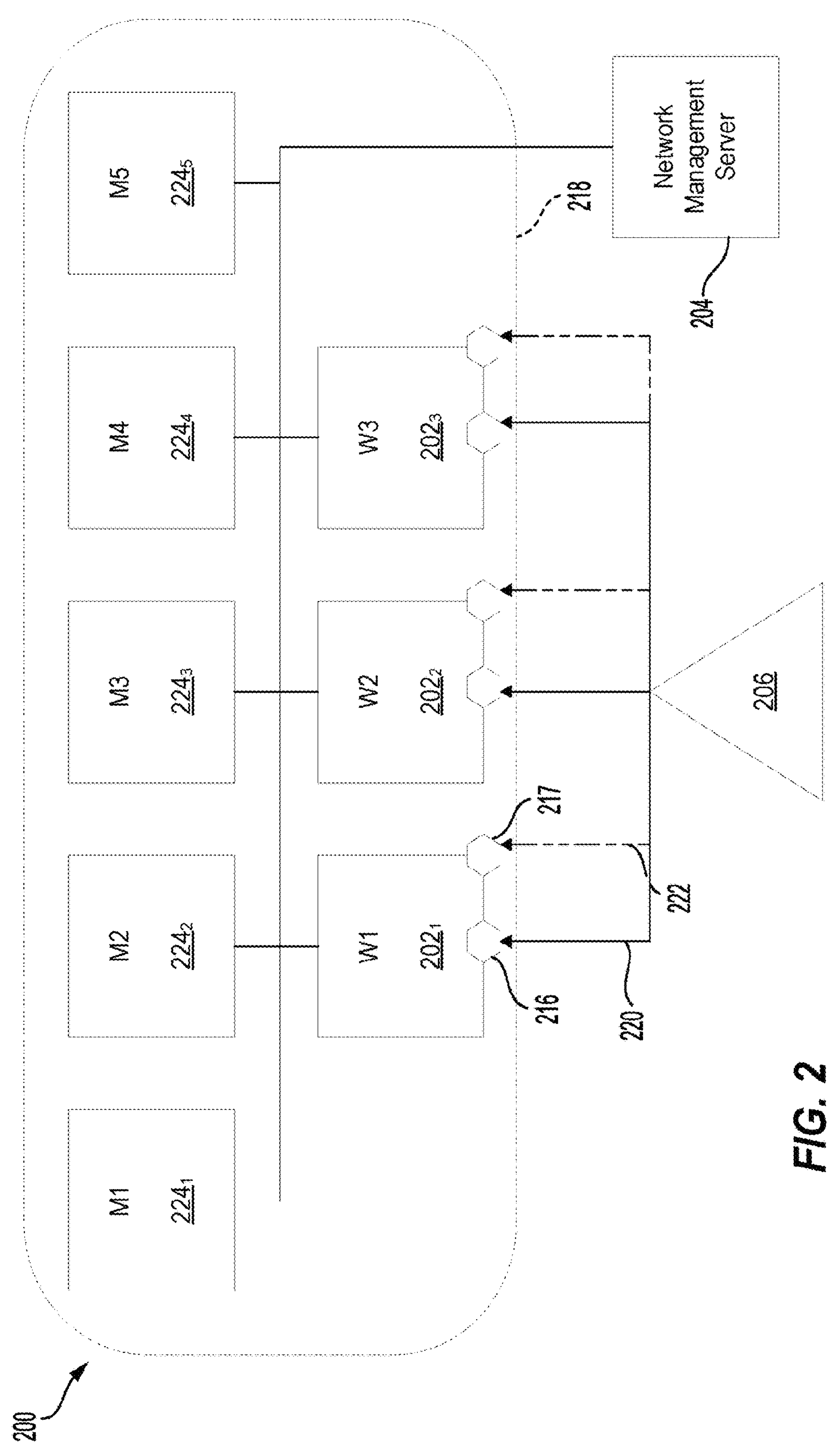

FIG. 2 illustrates a cluster network comprising a load balancer and a plurality of worker nodes in a cluster pool, according to at least one aspect of the present disclosure.

Figure 3:
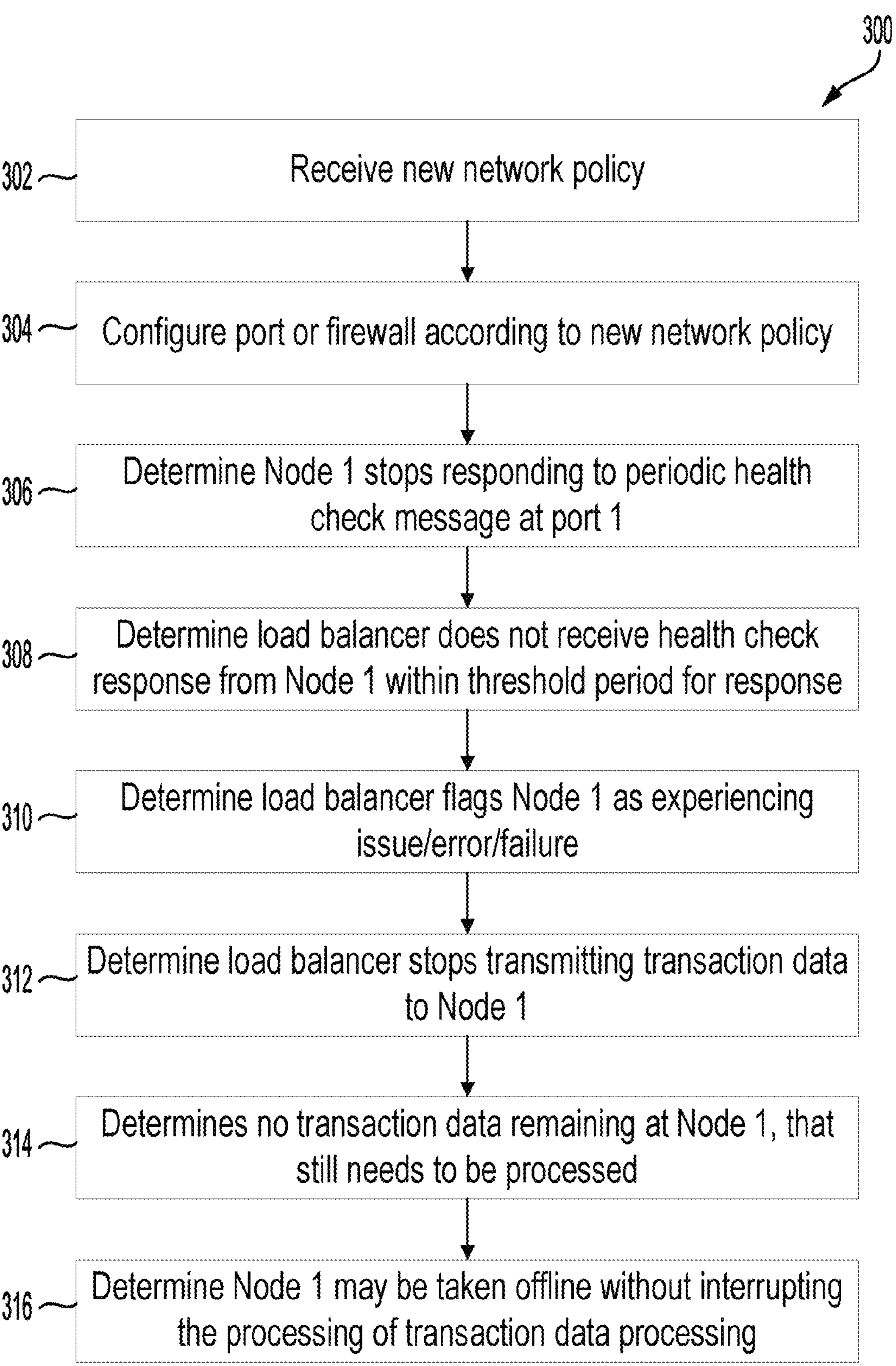

FIG. 3 is a logic flow diagram for implementing a new network policy, according to at least one aspect of the present disclosure.

Figure 4:
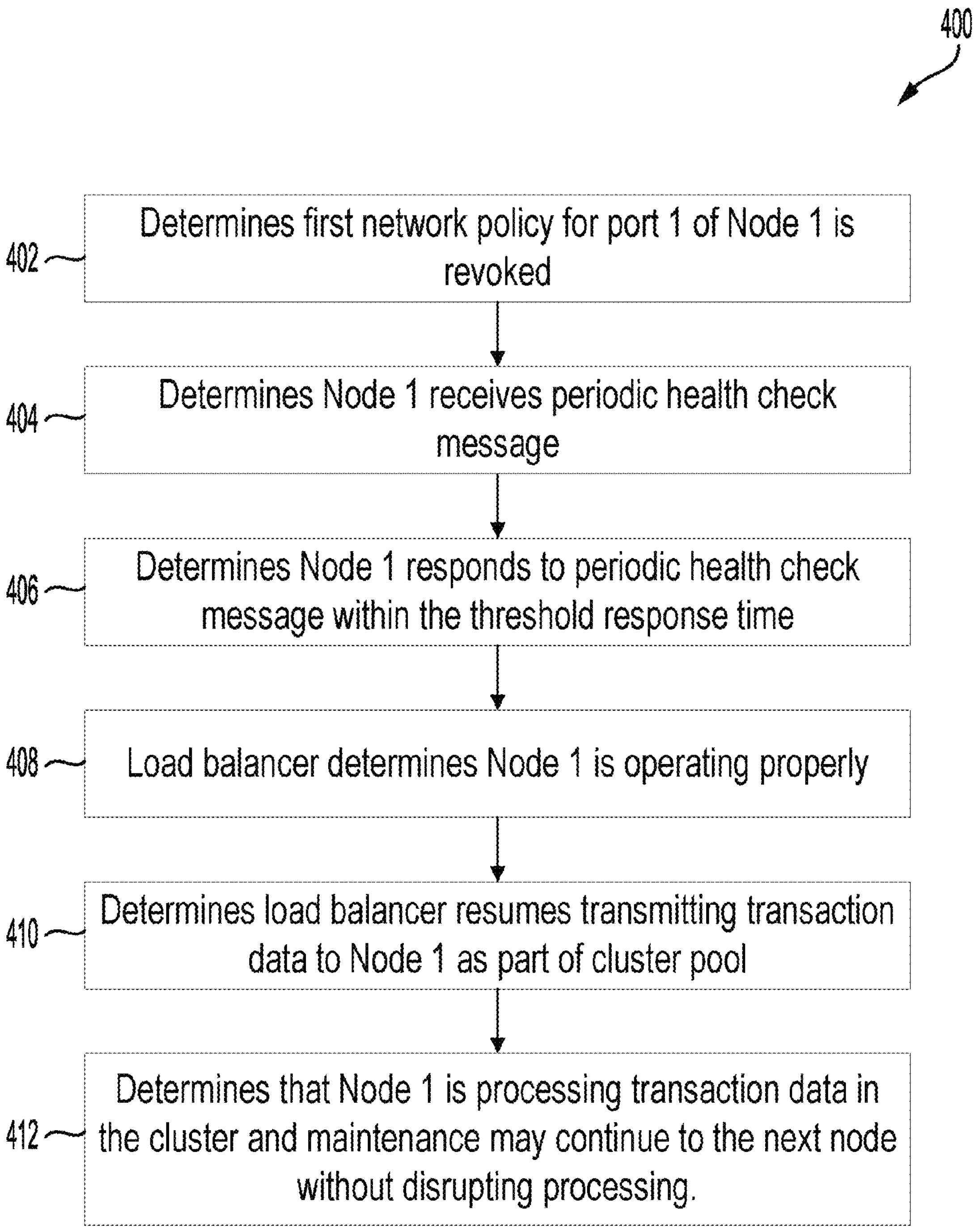

FIG. 4 is a logic flow diagram for revoking a network policy, according to at least one aspect of the present disclosure.

Figure 5:
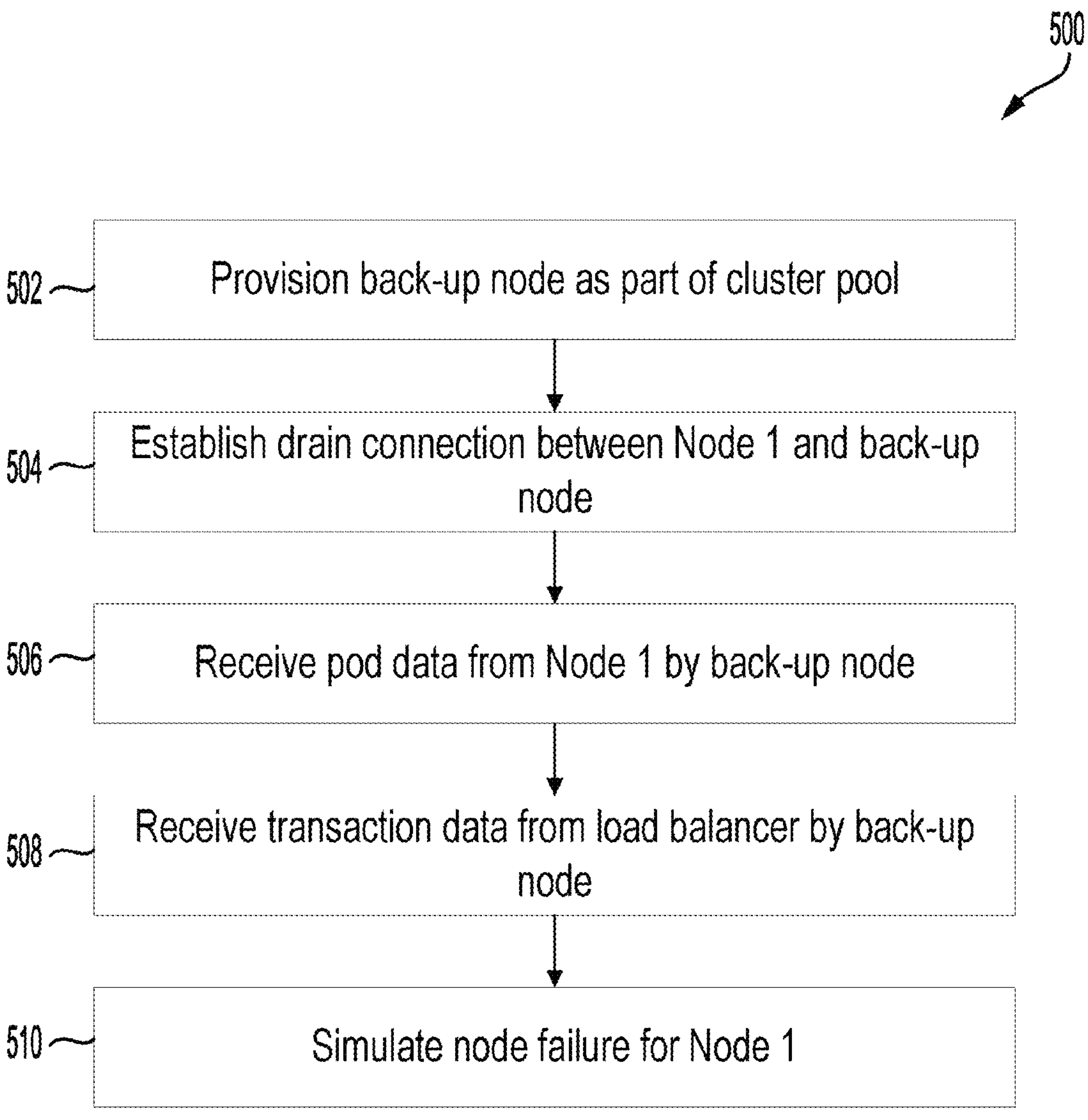

FIG. 5 is a logic flow diagram for provisioning a back-up node prior to implementing the network policy to simulate a failure at a first node, according to at least one aspect of the present disclosure.

Figure 6:
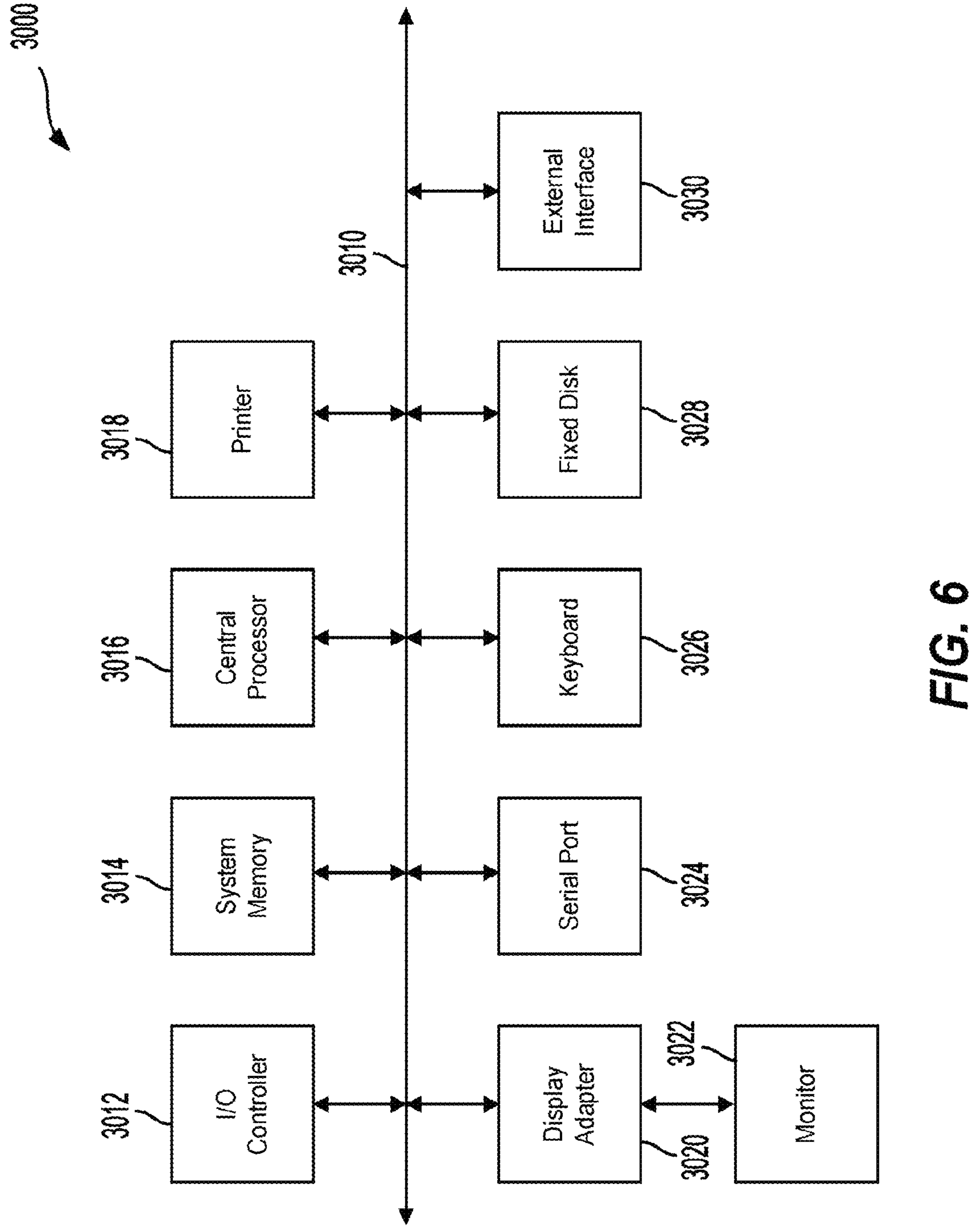

FIG. 6 presents a block diagram of a computer apparatus, according to at least aspect of the present disclosure.

Figure 7:
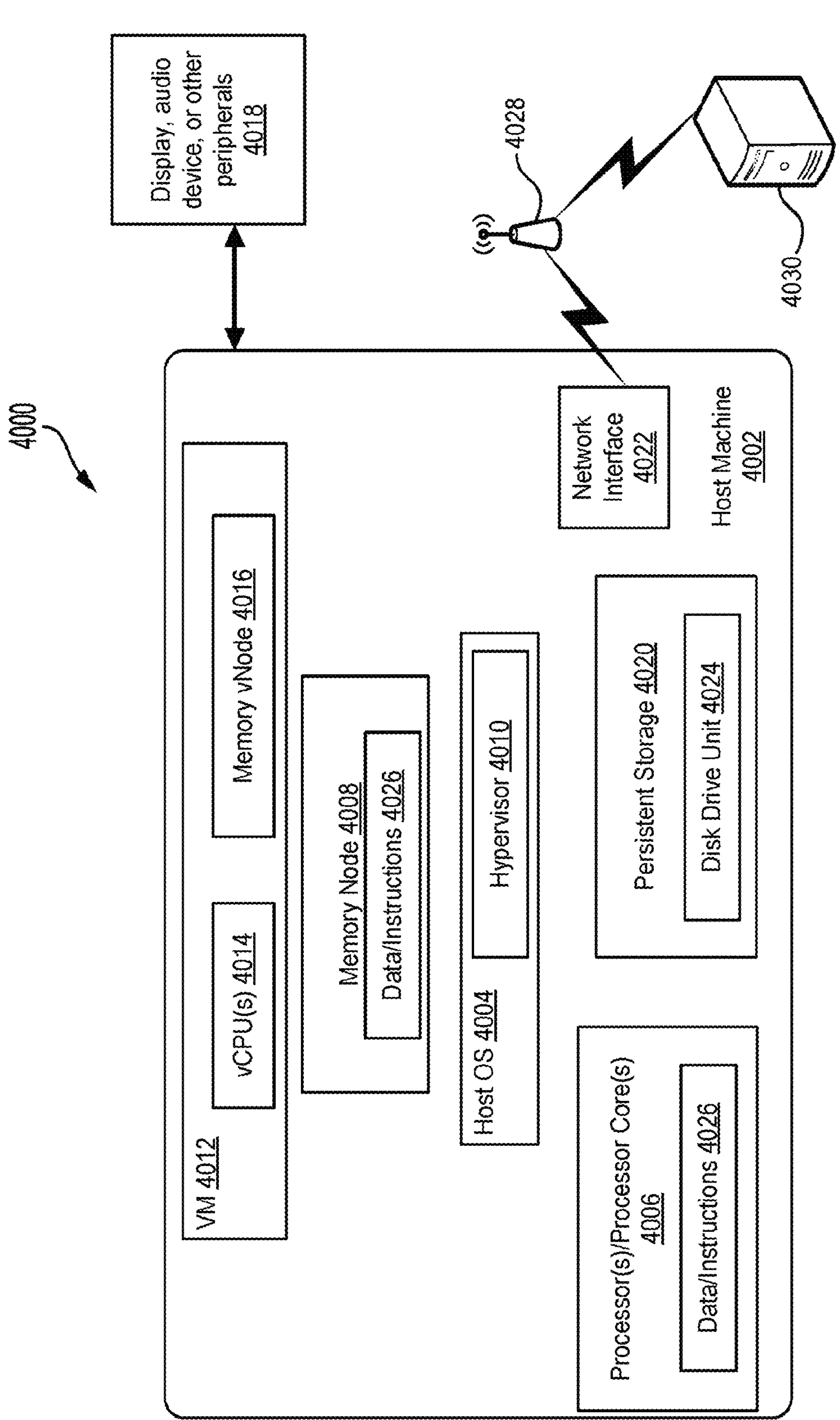

FIG. 7 is a diagrammatic representation of an example system that includes a host machine within which a set of instructions to perform any one or more of the methodologies discussed herein may be executed, according to at least aspect of the present disclosure.

DESCRIPTION

The following disclosure may provide exemplary systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

As used herein, the terms "client" and "client device" may refer to one or more client-side devices or systems (e.g., remote from a transaction service provider) used to initiate or facilitate a transaction (e.g., a payment transaction). Moreover, a "client" may also refer to an entity (e.g., a merchant, an acquirer, and/or the like) that owns, utilizes, and/or operates a client device for initiating transactions (e.g., for initiating transactions with a transaction service provider).

The terms "client device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

A "communication channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instances comprise a "secure communication channel" or a "tunnel," either of which may be established in any known manner, including the use of mutual authentication and a session key and establishment of a secure communications session. However, any method of creating a secure communication channel may be used, and communication channels may be wired or wireless, as well as long-range, short-range, or medium-range. By establishing a secure channel, sensitive information related to a payment device (such as account number, CVV values, expiration dates, etc.) may be securely transmitted between the two entities to facilitate a transaction As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

An "interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some embodiments or aspects, an interface may include an application programming interface (API) or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

An "original" transaction may include any transaction including an authorization provided by an issuer or an authorization provided on-behalf-of an issuer.

A "payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

"Provisioning" may include a process of providing data for use. For example, provisioning may include providing, delivering, or enabling a token on a device. Provisioning may be completed by any entity within or external to the transaction processing system. For example, in some embodiments or aspects, tokens may be provisioned by an issuer or a payment processing network onto a mobile device of a consumer (e.g. account holder). The provisioned tokens may have corresponding token data stored and maintained in the token vault or token registry. In some embodiments or aspects, a token vault or token registry may generate a token that may then be provisioned or delivered to a device. In some embodiments or aspects, an issuer may specify a token range from which token generation and provisioning can occur. Further, in some embodiments or aspects, an issuer may generate and notify a token vault of a token value and provide the token record information (e.g., token attributes) for storage in the token vault.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

As used herein, the term "system" may refer to one or more computing devices or combinations of computing devices (e.g., processors, servers, client devices, software applications, components of such, and/or the like).

The term "transaction data" may include any data associated with one or more transactions. In some embodiments or aspects, the transaction data may merely include an account identifier (e.g., a PAN) or payment token. Alternatively, in other embodiments or aspects, the transaction data may include any information generated, stored, or associated with a merchant, consumer, account, or any other related information to a transaction. For example, transaction data may include data in an authorization request message that is generated in response to a payment transaction being initiated by a consumer with a merchant. Alternatively, transaction data may include information associated with one or more transactions that have been previously processed and the transaction information has been stored on a merchant database or other merchant computer. The transaction data may include an account identifier associated with the payment instrument used to initiate the transaction, consumer personal information, products or services purchased, or any other information that may be relevant or suitable for transaction processing. Additionally, the transaction information may include a payment token or other tokenized or masked account identifier substitute that may be used to complete a transaction and protect the underlying account information of the consumer.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting embodiments or aspects, a transaction processing system may include one or more server computers with one or more processors and, in some non-limiting embodiments or aspects, may be operated by or on behalf of a transaction service provider.

A "user device" is an electronic device that may be transported and/or operated by a user. A user device may provide remote communication capabilities to a network. The user device may be configured to transmit and receive data or communications to and from other devices. In some embodiments or aspects, the user device may be portable. Examples of user devices may include mobile phones (e.g., smart phones, cellular phones, etc.), PDAs, portable media players, wearable electronic devices (e.g. smart watches, fitness bands, ankle bracelets, rings, earrings, etc.), electronic reader devices, and portable computing devices (e.g., laptops, netbooks, ultrabooks, etc.). Examples of user devices may also include automobiles with remote communication capabilities.

"User information" may include any information that is associated with a user. For example, the user information may include a device identifier of a device that the user owns or operates and/or account credentials of an account that the user holds. A device identifier may include a unique identifier assigned to a user device that can later be used to verify the user device. In some embodiments or aspects, the device identifier may include a device fingerprint. The device fingerprint may an aggregation of device attributes. The device fingerprint may be generated by a software development kit (SDK) provided on the user device using, for example, a unique identifier assigned by the operating system, an International Mobile Station Equipment Identity (IMEI) number, operating system (OS) version, plug-in version, and the like.

The present disclosure describes a cluster management platform comprising a pool of a plurality of worker nodes. The plurality of worker nodes are configured to process a continuous stream of transaction data (e.g., payment authorizations) from a plurality of external sources. The external sources are communicably coupled to an I/O (input/output) server at a network gateway. The I/O server comprises a load balancer configured to evenly disburse the stream of transaction data transitions to the plurality of nodes. The load balancer is configured based on a number of distribution factors including the total number of nodes in the cluster pool, an anticipated number of incoming transactions, and/or the estimated processing time for each transaction authorization. The configuration factors allow for real-time transaction data distribution to the plurality of worker nodes. The load balancer is rarely reconfigured based on the new or updated configuration factors. The cluster pool is configured to process transactions worldwide and does not experience a decrease in transaction data due to time zones, weekends, and/or holidays. Therefore, the network cannot afford to take down worker nodes for maintenance.

Each worker node in the cluster pool may correspond to a physical machine that requires periodic hardware, software patches, and/or firmware maintenance by maintenance personnel in a data center. In some cluster pools, there may be hundreds of worker nodes that correspond to respective physical machines. The maintenance personnel are responsible for performing scheduled maintenance on each node in the cluster pool. This may result in marathon maintenance periods where the maintenance personnel sequentially perform scheduled maintenance on one node or several nodes at a time until the entire cluster pool has been updated. The maintenance period may last several hours to several days, for example.

A back-up node may be added to or automatically provisioned in the cluster pool during the maintenance period to compensate for the worker nodes that are taken offline to undergo maintenance. Once the scheduled maintenance is completed, the worker node can resume operation in the cluster pool. Once all worker nodes in the cluster pool have been patched or updated, the back-up node can be taken offline, restoring the original node configuration in the cluster pool.

During maintenance periods, the maintenance personnel are traditionally in constant communication with a separate group that manages the I/O server(s). The I/O management personnel configure the load balancer of the I/O server. The load balancer distributes the transaction data to the plurality of nodes in the cluster pool. The maintenance personnel must communicate with the I/O management personnel so a specific node can be taken offline without disrupting or interrupting any pending transaction data processing. Additionally, the I/O management personnel must know the duration that the node will be offline so that the cluster configuration can compensate for the change in workload. Accordingly, the I/O management personnel manually update the load balancer to stop sending transaction data to a first node under maintenance during the maintenance period. When the I/O personnel receive notification from the maintenance personnel that the first node has been updated, the I/O personnel configure the load balancer to resume sending the first node transaction data as part of the cluster pool. The maintenance process may last for hours or days and ties up resources from I/O management and maintenance teams. Additionally, if the maintenance personnel encounter issues that require a node to be offline for a longer period, they must notify the I/O management personnel that additional offline time is needed to route transactions away from the node under maintenance. Team coordination extends the overall time of the maintenance period and can limit to availability to perform the maintenance in general. The scheduled maintenance can be performed only when personnel from both I/O management and maintenance are available. As a result, the maintenance periods are very costly because they tie up human capital from both the maintenance personnel team and the traffic personnel team.

The present disclosure describes various aspects of performing scheduled maintenance on nodes in a cluster pool that circumvent the need for constant communication between an I/O management team and a maintenance team. Using only the maintenance personnel reduces the amount of human capital, eliminates the need to coordinate scheduled maintenance time that works for multiple teams, and reduces the overall maintenance period because there is no communication/action delay.

The present disclosure leverages periodic status requests from a load balancer, generally known as performing a periodic health check by the load balancer. During periodic health checks, the load balancer sends a request via a periodic health check packets to a specific port of each node in the cluster pool to verify that each node is functioning properly. Once the node receives the periodic health check packet, the node has a predetermined amount of time to respond. If there is a delay in the response that exceeds a predetermined period, or no response is received at all, the load balancer determines that the node has experienced some type of error or failure that would prevent it from operating properly. As a result, the load balancer stops sending transaction data to the node, as part of the load balancing data distribution in the cluster pool. In various aspects, the present disclosure provides a network policy configured to simulate the failure at the node. A simulated node failure may be determined by the load balancer as a result of a blocked periodic health check packet or blocked node response, by the network policy.

Turning now to the figures, FIG. 1 illustrates a network architecture of a cluster network 100 comprising a plurality of worker nodes 102*a-n*, according to at least one aspect of the present disclosure. An I/O server 108 comprises load balancer 106 configured to evenly distribute transaction data to the plurality of worker nodes 102*a-n*. The I/O server 108 is located on the local network side of a network gateway 110 that bridges a wide area network 112 (WAN) with the local area network (LAN). The I/O server 108 is configured to receive transaction data from a plurality of external data sources 114-*n*. In various aspects, the I/O server 108 comprises hardware that is configurable to execute cloud cluster computing software (e.g. Kubernetes). The cloud cluster computing software may be configurable to execute a load balancer 106 for incoming transaction data received by the I/O server 108.

FIG. 1 further illustrates a network management server 104 in communication with the plurality of worker nodes 102*a-n*. The network management server 104 may receive a network policy and configure one or more nodes such that a periodic health check message is blocked at the health check port of the node. In various aspects, once the network policy is implemented the health check port may be blocked indefinitely until the network management server receives a second policy that removes the policy and unblocks the health check port. In another aspect, the network policy may be configured according to an expiration time-to-live (TTL) value. Once a TTL timer reaches a predetermined value, counts up or counts down to zero, the network policy may be automatically revoked.

In various aspects, the network management server 104 may act as a firewall block or intercept the periodic health check message before it reaches the node. The network management server 104 may perform deep packet inspection and monitor traffic for a specific address and port corresponding to a node. In one example, a network policy may be configured to identify the health check port of a first node in the destination field of a packet header. The policy may block all traffic to this destination. In this example, the health check port of the first node never receives the periodic health check message from the load balancer and therefore does not respond. In another example, a network policy may be configured to identify the health check port of a first node in the source field of a packet header. The policy may block all outgoing traffic from this source from reaching its destination. In this example, the health check port may still receive the periodic health check message from the load balancer, but the response may be blocked from reaching the load balancer.

FIG. 2 illustrates a cluster network 200 comprising a load balancer 206 and a plurality of worker nodes $\mathbf{202}_{1\text{-}3}$ (W1-W3) and master nodes $\mathbf{224}_{1\text{-}5}$ (M1-M5) (e.g., control nodes) in a cluster pool 218, according to at least one aspect of the present disclosure. Each worker node 202 in the plurality of worker nodes comprises at least two ports, a transaction data port 216 and a health check port 217. The load balancer 206 is configured to send a periodic health check message 222 to the health check port 217 to each worker node $\mathbf{202}_{1\text{-}3}$ (W1-W3) in a round robin sequence. The worker node $\mathbf{202}_{1\text{-}3}$ (W1-W3) is configured to transmit a response within a predetermined period to indicate that the worker node $\mathbf{202}_{1\text{-}3}$ (W1-W3) is healthy and may receive or continue to receive transaction data 220 at the transaction data port 216. It will be appreciated that the cluster network 200 is not limited to the illustrated configuration and there may be n worker nodes $\mathbf{202}_{1\text{-}n}$ and m master nodes $\mathbf{224}_{1\text{-}m}$, where n and m are any positive integer.

FIG. 3 is a logic flow diagram 300 for implementing a new network policy, according to at least one aspect of the present disclosure. With reference now to FIG. 3 together with FIG. 2, the network management server 204 receives 302 a new network policy to restrict network traffic directed to the health check port of a first node $\mathbf{202}_1$ (W1). The network management server 204 configures 304 the first node $\mathbf{202}_1$ (W1) or a firewall to block the periodic health check messages or all traffic with a port destination address of the health check port. The network management server 204 determines 306 that the periodic health check pod at the first node $\mathbf{202}_1$ (W1) does not receive periodic health check messages and therefore the first node 202 (W1) stops responding to the periodic health check messages sent by the load balancer 206. The network management server 204 monitors network traffic in the cluster network 200 and determines 308 that the load balancer 206 does not receive a response to the periodic health check message sent to the first node $\mathbf{202}_1$ (W1) within a predetermined period. A response received within a threshold period indicates to the load balancer 206 that the first node $\mathbf{202}_1$ (W1) is functioning properly. The network management server 204 determines 310, based on the failure to respond by first node $\mathbf{202}_1$ (W1), that the load balancer 206 infers that the first node $\mathbf{202}_1$ (W1) is experiencing an error or a failure. The network management server 204 monitors network traffic and determines 312 that the load balancer 206 stopped transmitting transaction data to the first node $\mathbf{202}_1$ (W1). The network management server 204 determines 314 based on a timestamp of the last transaction data received at the first node $\mathbf{202}_1$ (W1), and the after a processing time for transaction data, that all transaction data processing has been completed. The network management server 204 may be configured to wait a predetermined period after the last transaction data is received by the first node $\mathbf{202}_1$ (W1), and generate a notification that all pending processing has been completed upon the expiration of the predetermined period. The network management server 204 determines 316 that the first node $\mathbf{202}_1$ (W1) can be taken offline to perform maintenance without interrupting the processing of transaction data.

FIG. 4 is a logic flow diagram 400 for revoking a network policy, according to at least one aspect of the present disclosure. In various aspects, the network policy may be revoked by a new network policy or by the expiration of an existing policy. With reference to FIG. 4 together with FIG. 2, the new network policy or time to live value in the first policy may comprise a network policy status indicator that indicates to the network management server 204 that the first policy is no longer valid. The network management server 204 determines that the first policy is no longer valid and revokes 402 the first policy. The network management server 204 monitors network traffic and determines 404 that the first node $\mathbf{202}_1$ (W1) receives the periodic health check message from the load balancer. The network management server 204 monitors network traffic and determines 406 that the first node $\mathbf{202}_1$ (W1) responds to the periodic health check message within the predetermined period. The network management server 204 monitors network traffic and determines 408 that the load balancer 206 receives the periodic health check response within a predetermined period. The network management server 204 monitors network traffic and verifies 410 that the load balancer 206 has resumed transmitting transaction data to the first node $\mathbf{202}_1$ (W1). The network management server 204 determines 412 that the first node $\mathbf{202}_1$ (W1) is processing transaction data as part of the cluster pool 218 and the next node 202$_2$ (W2) in the round robin sequence can undergo maintenance without disrupting the traffic load of the cluster pool 218.

FIG. 5 is a logic flow diagram 500 for provisioning a back-up node prior to or in response to implementing the network policy to simulate a failure at a first node, according to at least one aspect of the present disclosure. With reference to FIG. 5 together with FIG. 2, the network policy may comprise instructions for the network management server 204 to provision 502 a back-up node 202$_2$ (W2) as part of the cluster pool 218. The network management server 204 establishes 504 a drain connection between a first node 202$_1$ (W1) scheduled for maintenance and the back-up node 202$_2$ (W2). The first node 202$_1$ (W1) transmits 506 a copy of all pod data to the back-up node 202$_2$ (W2) so that processing may seamlessly continue while the first node 202$_1$ (W1) is offline for maintenance. The back-up node 202$_2$ (W2) responds to a periodic health check message and receives 508 transaction data from the load balancer 206, as part of the cluster pool 218. Once the network management server 204 verifies that the back-up node 202$_2$ (W2) is actively processing transaction data in the cluster pool 218, the network management server 204 can simulate 510 node failure of the first node 202$_1$ (W1) to undergo maintenance. For maintenance on subsequent nodes 202$_3$ (W3), the back-up node 202$_2$ (W2) may remain active until all nodes have been updated. In various aspects, each node 202$_{1-3}$ (W1-W3) in the cluster pool 218 may transfer pod data to the back-up node 202$_2$ (W2) prior to the node undergoing maintenance.

FIG. 6 is a block diagram of a computer apparatus 3000 with data processing subsystems or components, according to at least one aspect of the present disclosure. The subsystems shown in FIG. 6 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 7 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A method comprising: receiving, by a network management server, a network policy corresponding to a node in a cluster pool comprising a plurality of nodes, wherein the node comprises a first port configured to receive transaction data and a second port configured to receive periodic health check messages from a load balancer; implementing, by the network management server, the network policy to configure a port restriction of the second port of the node, wherein the port restriction causes the load balancer to stop transmitting the transaction data to the first port; determining, by the network management server, that the transaction data received at the first port is processed by the node after implementing the network policy in preparing the node for maintenance; and revoking, by the network management server, the network policy to remove the port restriction at the second port after completion of the maintenance at the node based on a network policy status indicator.

Clause 2. The method of clause 1, wherein the port restriction causes a simulated error at the node that prevents the node from responding to the periodic health check messages within a predetermined period of time, and wherein the simulated error causes the load balancer to determine that the node is unable to process the transaction data.

Clause 3. The method of clause 1, wherein the network policy status indicator is a second network policy corresponding to the second port of the node, and wherein the second network policy removes the port restriction at the second port of the node.

Clause 4. The method of clause 1, wherein the network policy status indicator is a TTL (time-to-live) value, and wherein the network policy is removed upon expiration of the TTL value.

Clause 5. The method of clause 1, further comprising monitoring, by the network management server, that the node responds to at least one of the periodic health check messages within a predetermined period after the revoking of the network policy.

Clause 6. The method of clause 5, further comprising monitoring, by the network management server, that the node receives new transaction data at the first port after the revoking of the network policy.

Clause 7. The method of clause 1, further comprising: provisioning, by the network management server, a back-up node to the cluster pool; and initializing, by the network management server, the back-up node to receive the transaction data.

Clause 8. The method of clause 1, wherein the maintenance comprises at least one of installing a software patch on the node or repairing a hardware failure at the node.

Clause 9. A system comprising: a plurality of nodes; a cluster pool comprising the plurality of nodes; a load balancer server; a network management server communicably coupled to the plurality of nodes, wherein the network management server is configured to: receive a network policy corresponding to a node in a cluster pool, wherein the cluster pool comprises a plurality of nodes, and wherein the node in the cluster pool comprises a first port configured to receive transaction data and a second port configured to receive periodic health check messages from a load balancer; implement the network policy to configure a port restriction of the second port of the node, wherein the port restriction causes the load balancer to stop transmitting the transaction data to the first port; determine that transaction data received at the first port is processed by the node after implementing the network policy to prepare the node for maintenance; and revoke the network policy to remove the port restriction at the second port after completion of the maintenance at the node based on a network policy status indicator.

Clause 10. The system of clause 9, wherein the port restriction causes a simulated error at the node that prevents the node from responding to the periodic health check messages within a predetermined period of time, and wherein the simulated error causes the load balancer determines that the node us unable to process the transaction data.

Clause 11. The system of clause 9, wherein the network policy status indicator is a second network policy corresponding to the second port of the node, and wherein the second network policy removes the port restriction at the second port of the node.

Clause 12. The system of clause 9, wherein the network policy status indicator is a TTL (time-to-live) value, and wherein the network policy is removed upon expiration of the TTL value.

Clause 13. The system of clause 9, wherein the network management server is further configured to monitor that the node responds to at least one of the periodic health check messages within a predetermined period after revoking of the network policy.

Clause 14. The system of clause 13, wherein the network management server is further configured to monitor that the node receives new transaction data at the first port after revoking of the network policy.

Clause 15. The system of clause 9, wherein the network management server is further configured to: provision a back-up node to the cluster pool; and initialize the back-up node to receive the transaction data.

Clause 16. The system of clause 9, wherein the maintenance comprises at least one of installing a software patch on the node or repairing a hardware failure at the node.

Clause 17. A non-transitory computer readable medium, with instructions stored thereon, when executed by one or more processors, cause the one or more processors to perform operations comprising: receiving a network policy corresponding to a node in a cluster pool comprising a plurality of nodes, wherein the node comprises a first port configured to receive transaction data and a second port configured to receive periodic health check messages from a load balancer; provisioning a back-up node to the cluster pool; initializing the back-up node to receive the transaction data; implementing the network policy to configure a port restriction of the second port of the node, wherein the port restriction causes the load balancer to stop transmitting the transaction data to the first port; determining that transaction data received at the first port is processed by the node after implementing the network policy in preparing the node for maintenance; and revoking the network policy to remove the port restriction at the second port after completion of the maintenance at the node based on a network policy status indicator.

Clause 18. The non-transitory computer readable medium of clause 17, wherein the port restriction causes a simulated error at the node that prevents the node from responding to the periodic health check messages within a predetermined period of time, and wherein the simulated error causes the load balancer determines that the node us unable to process the transaction data.

Clause 19. The non-transitory computer readable medium of clause 17, when executed by one or more processors is further configured to perform operations comprising: receiving a second network policy corresponding to the node in the cluster pool, wherein the second network policy removes the port restriction for the second port.

Clause 20. The non-transitory computer readable medium of clause 17, wherein preparing the node for maintenance comprises draining pod data from the node to the back-up node.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method comprising:

receiving, by a network management server, a network policy corresponding to a node in a cluster pool comprising a plurality of nodes, wherein the node comprises a first port configured to receive transaction data and a second port configured to receive periodic health check messages from a load balancer;

implementing, by the network management server, the network policy to configure a port restriction of the second port of the node, wherein the port restriction causes the load balancer to stop transmitting the transaction data to the first port;

determining, by the network management server, that the transaction data received at the first port is processed by the node after implementing the network policy in preparing the node for maintenance; and revoking, by the network management server, the network policy to remove the port restriction at the second port after completion of the maintenance at the node based on a network policy status indicator.

2. The method of claim 1, wherein the port restriction causes a simulated error at the node that prevents the node from responding to the periodic health check messages within a predetermined period of time, and wherein the simulated error causes the load balancer to determine that the node is unable to process the transaction data.

3. The method of claim 1, wherein the network policy status indicator is a second network policy corresponding to the second port of the node, and wherein the second network policy removes the port restriction at the second port of the node.

4. The method of claim 1, wherein the network policy status indicator is a TTL (time-to-live) value, and wherein the network policy is removed upon expiration of the TTL value.

5. The method of claim 1, further comprising monitoring, by the network management server, that the node responds to at least one of the periodic health check messages within a predetermined period after the revoking of the network policy.

6. The method of claim 5, further comprising monitoring, by the network management server, that the node receives new transaction data at the first port after the revoking of the network policy.

7. The method of claim 1, further comprising:

provisioning, by the network management server, a back-up node to the cluster pool; and initializing, by the network management server, the back-up node to receive the transaction data.

8. The method of claim 1, wherein the maintenance comprises at least one of installing a software patch on the node or repairing a hardware failure at the node.

9. A system comprising:

a plurality of nodes;

a cluster pool comprising the plurality of nodes;

a load balancer server;

a network management server communicably coupled to the plurality of nodes, wherein the network management server is configured to:

receive a network policy corresponding to a node in a cluster pool, wherein the cluster pool comprises a plurality of nodes, and wherein the node in the cluster pool comprises a first port configured to receive transaction data and a second port configured to receive periodic health check messages from a load balancer;

implement the network policy to configure a port restriction of the second port of the node, wherein the port restriction causes the load balancer to stop transmitting the transaction data to the first port;

determine that transaction data received at the first port is processed by the node after implementing the network policy to prepare the node for maintenance; and revoke the network policy to remove the port restriction at the second port after completion of the maintenance at the node based on a network policy status indicator.

10. The system of claim 9, wherein the port restriction causes a simulated error at the node that prevents the node from responding to the periodic health check messages within a predetermined period of time, and wherein the simulated error causes the load balancer determines that the node us unable to process the transaction data.

11. The system of claim 9, wherein the network policy status indicator is a second network policy corresponding to the second port of the node, and wherein the second network policy removes the port restriction at the second port of the node.

12. The system of claim 9, wherein the network policy status indicator is a TTL (time-to-live) value, and wherein the network policy is removed upon expiration of the TTL value.

13. The system of claim 9, wherein the network management server is further configured to monitor that the node responds to at least one of the periodic health check messages within a predetermined period after revoking of the network policy.

14. The system of claim 13, wherein the network management server is further configured to monitor that the node receives new transaction data at the first port after revoking of the network policy.

15. The system of claim 9, wherein the network management server is further configured to:

provision a back-up node to the cluster pool; and initialize the back-up node to receive the transaction data.

16. The system of claim 9, wherein the maintenance comprises at least one of installing a software patch on the node or repairing a hardware failure at the node.

17. A non-transitory computer readable medium, with instructions stored thereon, when executed by one or more processors, cause the one or more processors to perform operations comprising:

receiving a network policy corresponding to a node in a cluster pool comprising a plurality of nodes, wherein the node comprises a first port configured to receive transaction data and a second port configured to receive periodic health check messages from a load balancer;

provisioning a back-up node to the cluster pool;

initializing the back-up node to receive the transaction data;

implementing the network policy to configure a port restriction of the second port of the node, wherein the port restriction causes the load balancer to stop transmitting the transaction data to the first port;

determining that transaction data received at the first port is processed by the node after implementing the network policy in preparing the node for maintenance; and revoking the network policy to remove the port restriction at the second port after completion of the maintenance at the node based on a network policy status indicator.

18. The non-transitory computer readable medium of claim 17, wherein the port restriction causes a simulated error at the node that prevents the node from responding to the periodic health check messages within a predetermined period of time, and wherein the simulated error causes the load balancer determines that the node us unable to process the transaction data.

19. The non-transitory computer readable medium of claim 17, when executed by one or more processors is further configured to perform operations comprising:

receiving a second network policy corresponding to the node in the cluster pool, wherein the second network policy removes the port restriction for the second port.

20. The non-transitory computer readable medium of claim 17, wherein preparing the node for maintenance comprises draining pod data from the node to the back-up node.

* * * * *